J. C. ENGLISH.
TALKING MACHINE.
APPLICATION FILED MAY 29, 1909. RENEWED SEPT. 24, 1914.

1,181,655.

Patented May 2, 1916.
6 SHEETS—SHEET 1.

WITNESSES
F. J. Hartman.
A. J. Gardner.

INVENTOR
John C. English

BY
H. Vree Petty

ATTORNEY

J. C. ENGLISH.
TALKING MACHINE.
APPLICATION FILED MAY 29, 1909. RENEWED SEPT. 24, 1914.

1,181,655.

Patented May 2, 1916.
6 SHEETS—SHEET 2.

WITNESSES

INVENTOR
John C. English
BY
ATTORNEY

J. C. ENGLISH.
TALKING MACHINE.
APPLICATION FILED MAY 29, 1909. RENEWED SEPT. 24, 1914.

1,181,655.

Patented May 2, 1916.
6 SHEETS—SHEET 4.

WITNESSES
W. J. Hartman.
A. J. Gardner.

INVENTOR
John C. English
BY
Horace Pettit.
ATTORNEY

J. C. ENGLISH.
TALKING MACHINE.
APPLICATION FILED MAY 29, 1909. RENEWED SEPT. 24, 1914.
1,181,655.
Patented May 2, 1916.
6 SHEETS—SHEET 6.
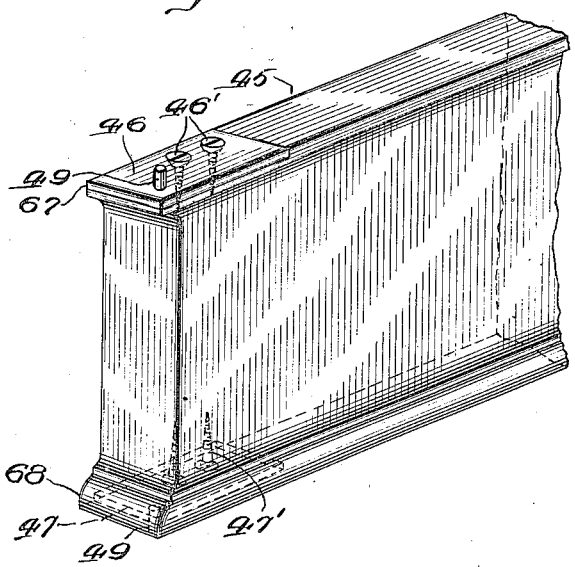
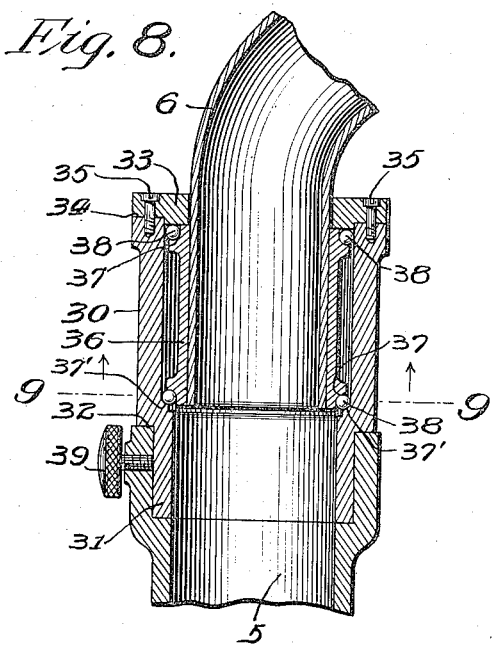
WITNESSES
F. J. Hartman
A. S. Gardner
INVENTOR
John C. English
BY
Horace Petty
ATTORNEY

UNITED STATES PATENT OFFICE.

JOHN C. ENGLISH, OF CAMDEN, NEW JERSEY, ASSIGNOR TO VICTOR TALKING MACHINE COMPANY, A CORPORATION OF NEW JERSEY.

TALKING-MACHINE.

1,181,655.

Specification of Letters Patent.  Patented May 2, 1916.

Application filed May 29, 1909, Serial No. 499,080. Renewed September 24, 1914. Serial No. 363,387.

*To all whom it may concern:*

Be it known that I, JOHN C. ENGLISH, a citizen of the United States, and a resident of the city of Camden, county of Camden, and State of New Jersey, have invented certain new and useful Improvements in Talking-Machines, of which the following is a specification.

The main objects of this invention are to provide a compact, strong and durable talking machine of artistic appearance having an inclosed amplifier; to provide an inclosed talking machine having a casing which may be readily taken apart for repairs or transportation; to provide a talking machine having a record support, a radial sound box arm and a sound box carried thereby and provided with a removable cover for inclosing the record support, the sound box and a portion of the radial arm; to provide a talking machine having a casing, a hollow bracket fixed upon the outside of the casing, a sound box arm and sound box carried over the casing by the bracket, an amplifier carried by the bracket in the base of the casing, and a removable cover over the sound box and a portion of the sound box arm; to provide an improved door construction for talking machines; to provide an improved anti-friction mounting for a radial sound box arm; and to provide other improvements as will appear hereinafter.

Figure 1:
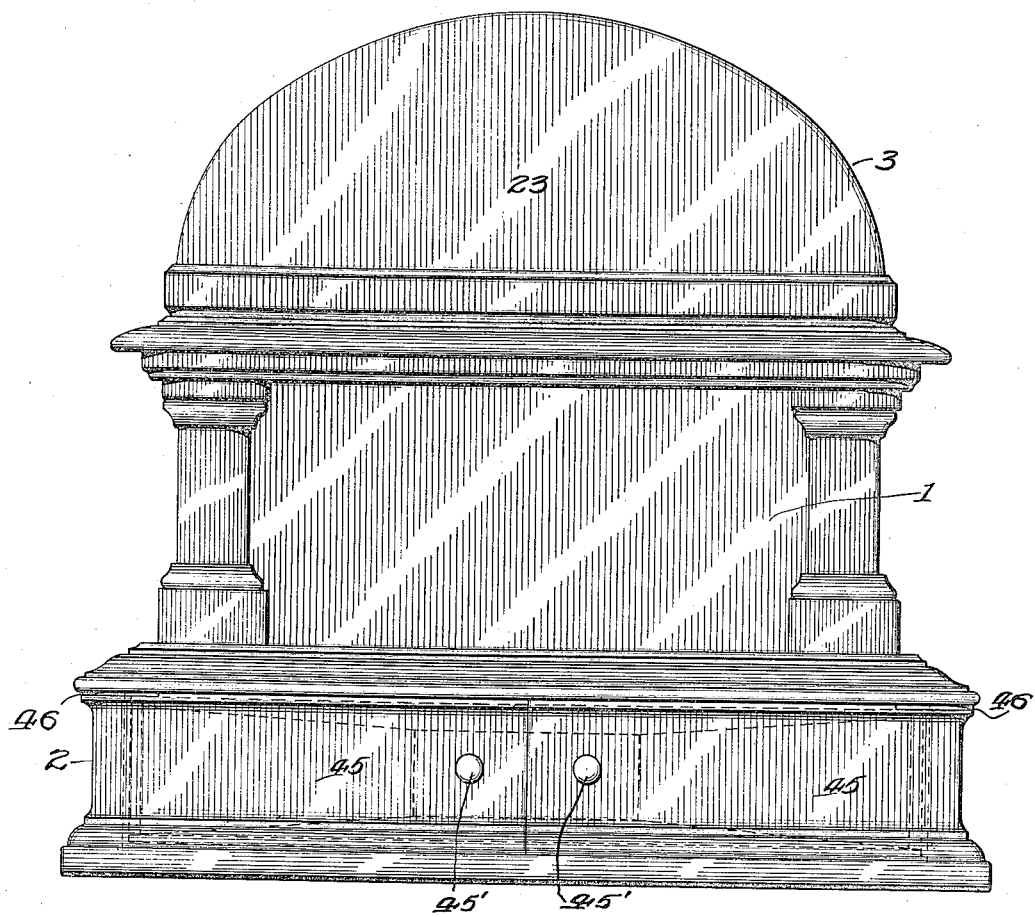
Figure 2:
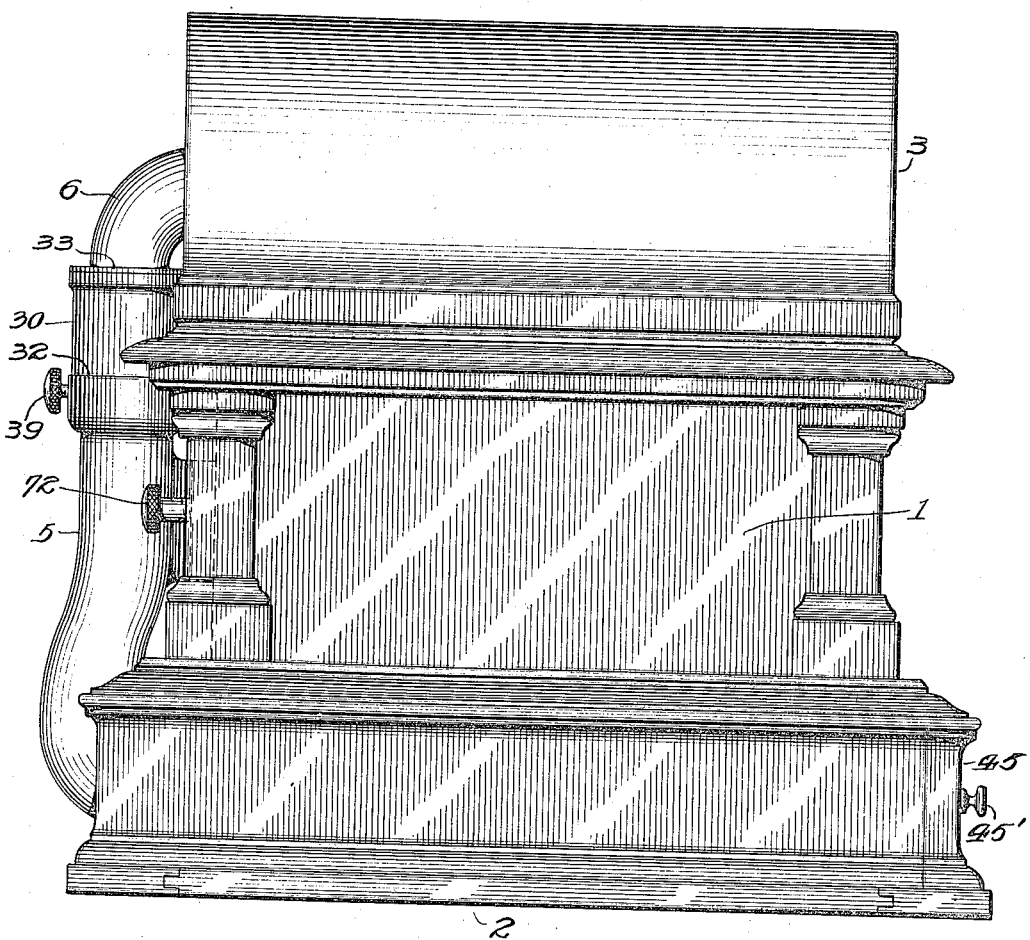
Figure 3:
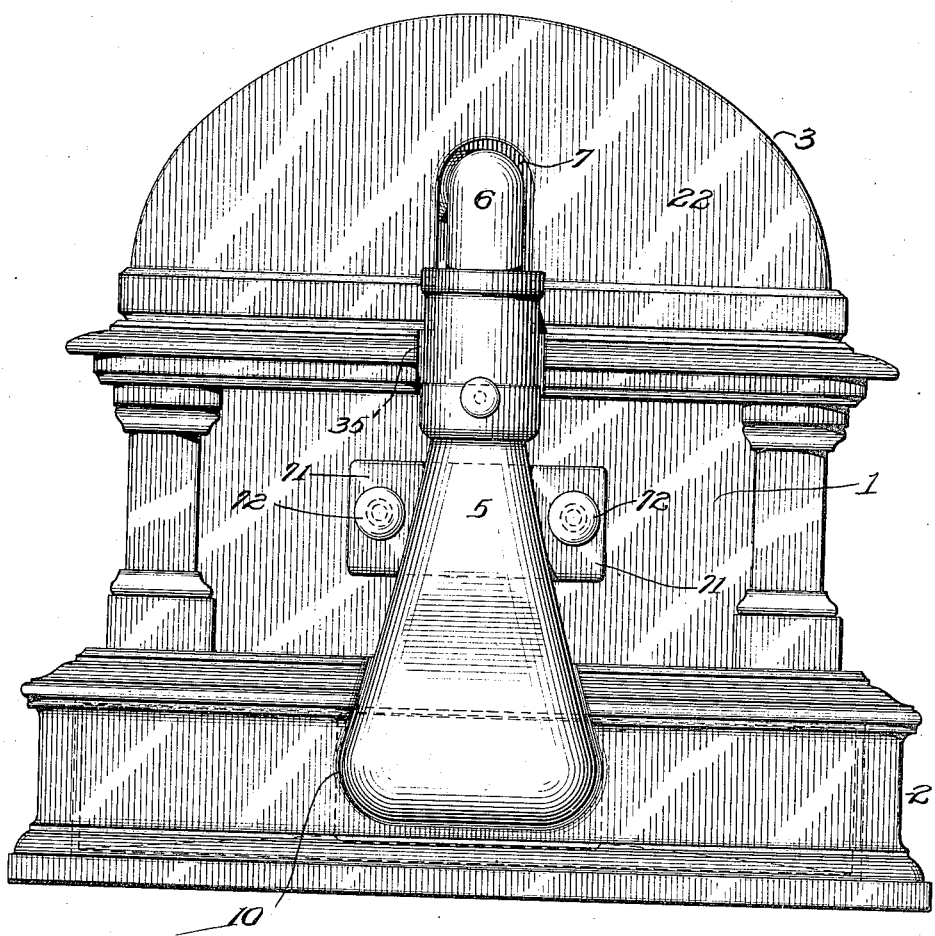
Figure 4:
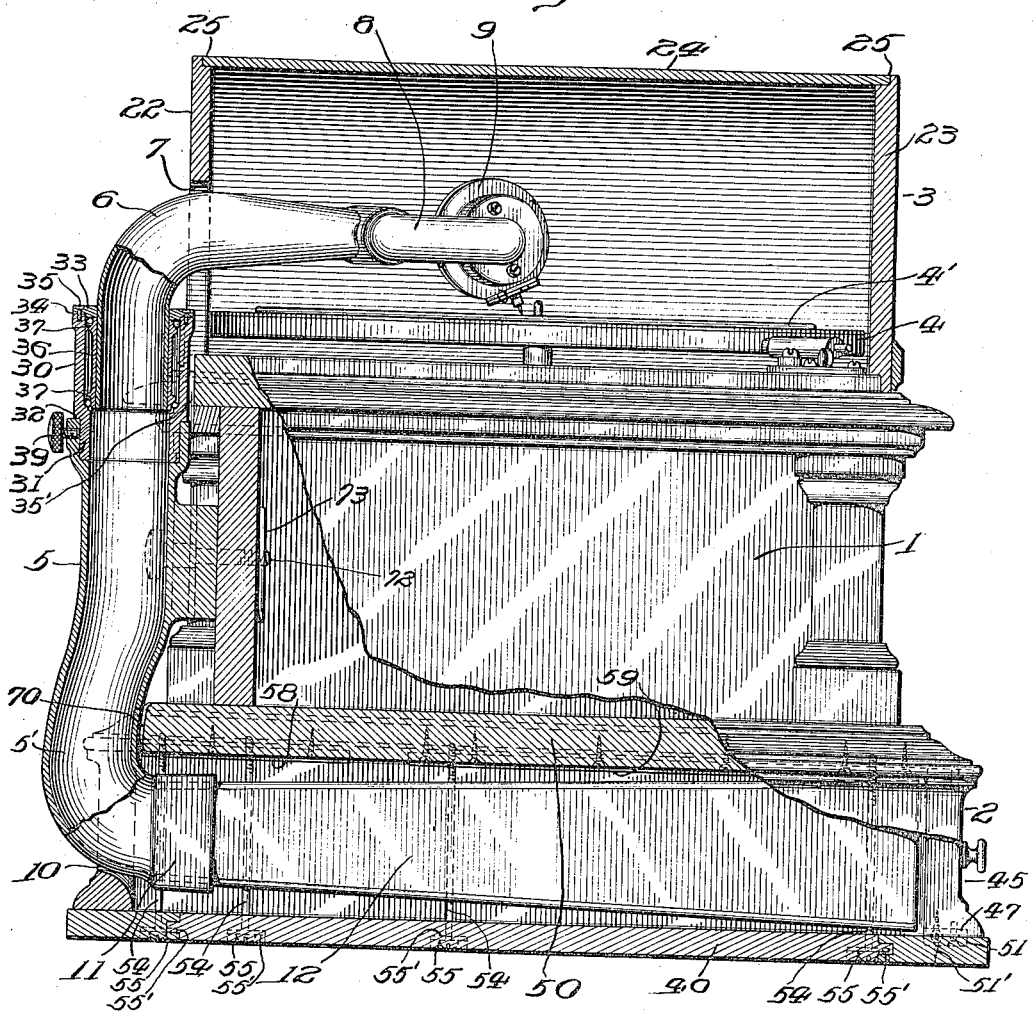
Figure 5:
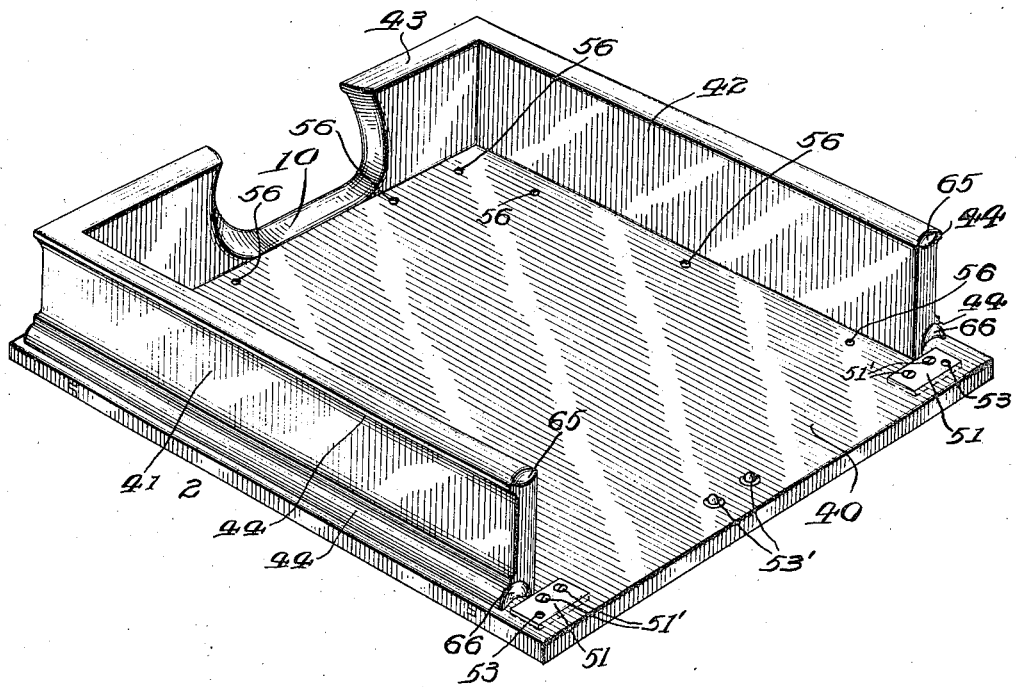
Figure 6:
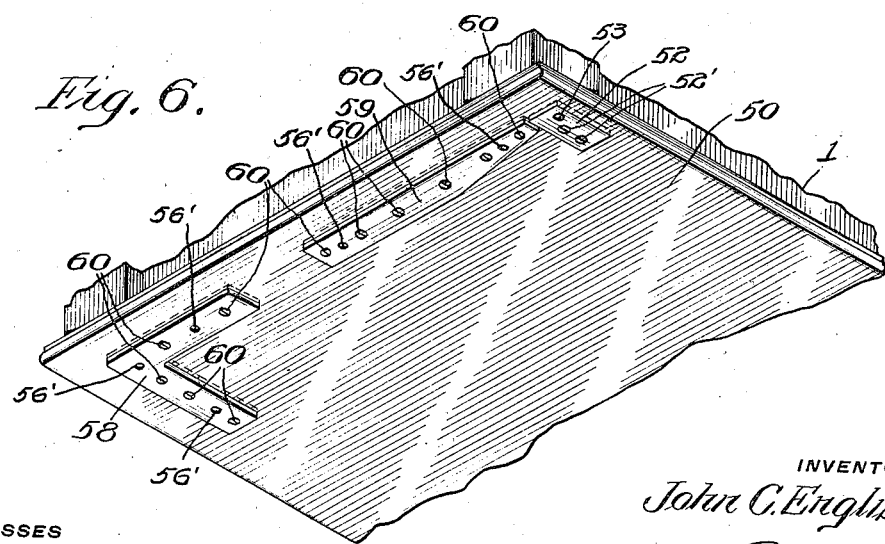

In the accompanying drawings Figure 1 is a front elevation of a talking machine constructed in accordance with this invention; Fig. 2 a side elevation of the same; Fig. 3 a rear elevation of the same; Fig. 4 a side elevation of the same partly in longitudinal vertical section; Fig. 5 a top perspective view of a portion of the same; Fig. 6 a fragmentary bottom perspective view of a portion of the same immediately above the portion shown in Fig. 5; Fig. 7 a fragmentary perspective view of one of the doors of the same; Fig. 8 a vertical section of the anti-friction mounting of the radial sound box arm; Fig. 9 a transverse section on line 9—9 of Fig. 8.

Referring to the drawings, which show a single embodiment of this invention, the device comprises a casing or cabinet consisting of a body or main portion 1 mounted upon a removable base portion 2, the top of the body being provided with a removable cover 3. Mounted upon the main portion 1 of the casing is the usual turntable 4 for supporting a disk record 4' and within the main portion 1 of the casing is the usual motor (not shown) for actuating the turntable. Outside of the casing and rigidly secured to the rear side thereof is a hollow upwardly extending bracket 5, rotatably mounted in the upper cylindrical end of which is a radial sound box arm 6, extending inwardly through an arched recess 7 in the lower edge of the rear end of the cover 3, and over the top of the turntable 4, and carrying connected to its inner or free end, by means of the usual U-shaped tube 8, the usual sound box 9.

The bracket 5 flares downwardly and the opening 5' through the bracket increases constantly in area downwardly and the lower end of the bracket 5 projects through an opening 10, provided therefor in the base of the casing, and terminates within the base adjacent the opening in a rectangular, oblong, horizontally arranged socket 11, in which is rigidly mounted one end of a transversely rectangular amplifier 12, which is entirely supported by the bracket 5, and which terminates at its free end adjacent the front of the base of the casing, the bracket and the amplifier being entirely free from contact with the base of the casing. Wax or other suitable material may be applied in the joint between the amplifier and the bracket to seal the joint and to hold the amplifier securely in position. The ends 22 and 23 of the cover 3 of the cabinet have substantially straight lower edges and curved upper edges making the ends substantially semi-elliptical in shape, and the top 24 of the cover is curved to bring the upper surface of the top flush with the ends, the upper inner edges of the ends being recessed as at 25 to receive the ends of the top. The height of the top is sufficient to permit the sound box to be inverted and to rest when in inoperative position upon the upper part of the sound box arm as is usual. The dimensions of the cover and of the aperture in the rear end of the cover are such that the cover may be left in position if preferred, while the machine is being operated.

For rotatably supporting the radial sound box arm 6, the upper end of the hollow bracket 5 is substantially cylindrical in shape and is enlarged externally and provided internally with an annular recess extending from the top of the bracket a short distance downwardly in the enlarged portion of the bracket forming a socket in which telescopes a substantially cylindrical hollow head or casing 30, the lower end of the head being provided with an external annular recess to form a cylindrical neck 31, fitting in the bracket, and an annular shoulder 32, resting against the upper end of the bracket. The upper end of the head 30, is closed by an annular cover 33, the under surface of which is provided with an annular peripheral recess 34, to receive the upper end of the head and the cover is held in place by screws 35, through the cover and threaded into the head. The rear edge of the upper portion of the body of the cabinet is preferably recessed as at 35′ to receive the inner side of the head 30 and the inner side of the upper end of the bracket 5.

The outer or larger end of the taper arm 6 is substantially cylindrical and fits snugly but rotatably through the central opening of the cover 33 and extends downwardly in the head. The portion of the arm 6 within the head is surrounded by a sleeve 36, rigidly secured to the arm by any suitable means, and is enlarged at each end and provided at each end with an annular groove 37, coaxial therewith to form bearings for anti-friction balls 38. The interior of the head 30 is enlarged to receive the sleeve and to form bearings 37′, opposite the bearings 37 of the sleeve, the oppositely disposed bearings forming annular race ways to hold the balls 38 in place. The balls surrounding the upper end of the sleeve rest in the angle between the side and cover of the head, and the balls surrounding the lower end of the sleeve rest in the annular groove 37′, between the lower portion and the upper enlarged portion of the head. The balls in each raceway are separated by means of segmental space bars, round in cross section and of less diameter than the balls, loosely mounted in the raceway. Preferably but three balls are used in each raceway, the balls being equispaced and each ball being separated from the adjacent ball by means of one of the segmental space bars, forming a three-point bearing or support in each raceway, for the sound box arm, the advantages of which are obvious. The head is held in a fixed position in the hollow bracket 5 by means of a thumb screw 39, and may be readily removed from the bracket by loosening the screw.

The base of the cabinet projects outwardly from each side of the main portion 1 of the cabinet, so as to permit of the use of a relatively large amplifier within the base, and the base comprises a bottom member 40, two side members 41—42, and an end member 43 rigidly secured together. The end member is recessed as at 10, as heretofore described, to receive the lower end of the hollow bracket 5, and the side members 41 and 42 extend from the end member toward the front of the machine and terminate a short distance from the front edge of the bottom member 40. The upper and lower edges of the outer surfaces of the sides 41 and 42 are provided with moldings 44, integral therewith to increase the rigidity of the sides and to add to the ornamental effect of the casing.

The front of the base of the cabinet is formed by the two doors 45, the top upper edges being flush with the upper edges of the sides 41 and 42 of the base, the outer ends of the doors being flush with the side surfaces of the sides of the base, and the inner ends of the doors meeting centrally of the front of the cabinet. Each of these doors is provided with a knob 45′ and upon its upper edge at its outer end with a plate 46, set into a recess provided therefor in the door and held in position by means of screws 46′, the upper surface and the side edges and the outer end edge of the plate being flush with the corresponding surfaces of the door. The lower edge of each door is provided with a corresponding plate 47 fixed in the recess provided therefor in the door and held in position by screws 47′. Each of these plates is provided with a vertically projecting pintle 49 rigid therewith, the two pintles upon each door being in vertical alinement.

For holding the doors rotatably in position between the bottom member 40 of the base and the bottom member 50 of the main portion of the cabinet, a plate 51 is set into a recess provided therefor in the upper surface of the bottom member 40 of the base in front of the end of each of the side members 41 and 42, and held in position by means of screws 51′ and a corresponding plate 52 is set into the lower surface of the bottom member 50 of the main portion of the cabinet, opposite each plate 51 and held in position by means of screws 52′. Between each pair of these plates in the bottom members of the cabinet is mounted one of the doors 45, the pintles of the door engaging rotatably in apertures 53 provided therefor in the plates. Spring catches 53′ are mounted in the upper side of the bottom 40 of the base to hold the doors when closed.

For detachably securing the base of the cabinet to the main portion thereof bolts 54, preferably having round slotted heads 55, are passed through washers 55′, apertures 56 provided therefor in the bottom member of the base and are threaded into apertures 56′ in plates 58 and 59 secured to the under surface of the bottom member 50 of the main portion of the cabinet by means of screws 60, the washers and heads of the bolts fitting in recesses provided therefor in the under surface of the base. These latter plates 58 and 59 project downwardly from the under surface of the main portion of the cabinet and are arranged within and in contact laterally with the inner surfaces of the sides and rear end of the base of the cabinet to hold the sides and end of the base rigid and to facilitate the adjustment of the base in attaching and detaching it from the main portion of the cabinet. Two of these plates 58 are each substantially L-shaped and are arranged to engage one in each rear corner of the base, while the remaining two plates 59 are arranged one upon each side of the cabinet to engage against the inner surfaces of the sides of the base. The axis of rotation of each door is substantially in alinement with the outer flat surface of the adjacent side of the base, and the ends of the sides of the base are recessed at top and bottom as at 65 and 66 to receive the projecting portions 67 and 68 of the end of the adjacent door when the door is opened.

For compactness, the projecting rear edge of the bottom 50 of the main portion of the cabinet is recessed as at 70 to receive the downwardly projecting portion of the hollow bracket 5, and the hollow bracket is curved inwardly above this projecting portion 50 and toward the rear side of the cabinet to which it is secured by means of a base plate 71, integral with the bracket and projecting laterally upon opposite sides thereof, and which is detachably fastened to the back of the cabinet by means of thumb screws 72, which pass through apertures provided therefor in the base plate 71 and the back of the cabinet and are threaded into a plate 73 upon the inside of the cabinet.

Although only one form has been described in which this invention may be embodied, it is obvious that many changes might be made in the construction set forth without departing from the spirit of this invention or the scope of the appended claims.

Having thus described the invention, I claim and desire to protect by Letters Patent of the United States:—

1. In a talking machine, the combination with a cabinet comprising a body portion and a portion arranged below said body portion and projecting laterally therefrom, of an upwardly extending hollow bracket secured to said cabinet and extending outside thereof close to and generally conforming to the outline of said cabinet, and having a lower portion projecting through an aperture therefor in one side of and in the top of said laterally projecting portion, and sound reproducing means communicating with said bracket.

2. In a talking machine the combination with a cabinet comprising a main portion for containing a motor and a base having a portion projecting laterally from said main portion, of a hollow bracket rigidly secured to the exterior of said cabinet and projecting through an aperture therefor in one side of said base and the top of said laterally projecting portion thereof, and an amplifier in said base communicating with said bracket.

3. In a talking machine the combination with a cabinet comprising a main portion for containing a motor, and a base having a portion projecting laterally from said main portion, of a hollow bracket rigidly secured to the exterior of said cabinet and projecting through an aperture provided therefor in one side of said base and the top of the said laterally projecting portion thereof, and an amplifier in said base wholly supported by and communicating with said bracket.

4. In a talking machine the combination with a cabinet comprising a main portion for containing a motor, and a base having a portion projecting laterally from said main portion, of a hollow bracket rigidly secured to the exterior of said cabinet and projecting through an aperture provided therefor in one side of said base and the top of the said laterally projecting portion thereof, and an amplifier in said base carried by and communicating with said bracket, and said amplifier being entirely out of contact with said cabinet.

In witness whereof I have hereunto set my hand this 27th day of May, A. D. 1909.

JOHN C. ENGLISH.

Witnesses:
EDWARD KARCHER MACEWAN,
FRANK BARCLAY MIDDLETON, Jr.